United States Patent Office 3,441,533
Patented Apr. 29, 1969

3,441,533
PROCESS FOR THE PRODUCTION OF ACRYLONITRILE POLYMERS BY POLYMERIZING ON THE PRESENCE OF AN AROMATIC SULFONAMIDE
Carlhans Suling, Leverkusen, and Heino Logemann, Leverkusen-Schlebusch, Germany, assignors to Farbenfabriken Bayer, Aktiengesellschaft, Leverkusen, Germany, a corporation of Germany
No Drawing. Filed Mar. 20, 1967, Ser. No. 624,222
Claims priority, application Germany, Mar. 30, 1966,
F 48,806
Int. Cl. C08f 1/08, 1/76, 3/76
U.S. Cl. 260—30.8          2 Claims

ABSTRACT OF THE DISCLOSURE

Process for preparing acrylonitrile polymer solutions by polymerizing acrylonitrile in an organic solvent at a temperature of −68° C. to +10° C. in the presence of a catalytic amount of an alkali metal salt of an aromatic sulfonamide of the formula

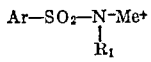

wherein Me is lithium, sodium, potassium, rubidium, or caesium, Ar is an aryl radical, and $R_1$ is an alkyl radical. The polymer solutions prepared by this process may be employed to produce moldings, films, or the like.

---

This invention relates to a process for the production of acrylonitrile polymers by polymerising acrylonitrile in solution.

It is known that polyacrylonitrile can be polymerised in solution in a variety of solvents. As far as the conventional polymerisation initiators for solution polymerisation are concerned, it is necessary to distinguish between two large groups:

(1) Radical initiators or initiation systems (cf. Belgian patent specification No. 572,665, equivalent to U.S. Patent 3,020,265). Initiation systems of this type have the disadvantage that polymerisation has to be carried out at relatively high temperatures and that, due to the high transfer constants of the solvents, the required degree of polymerisation can only be obtained under technically unfavourable conditions, for example, a high monomer concentration coupled with long reaction times.

(2) Initiators or initiation systems which initiate polymerisation by an ionic mechanism (cf. U.S. patent specification No. 3,006,894). Initiators such as these are active even at low temperatures. One disadvantage of the conventional catalysts or catalyst systems which initiate polymerisation by an ionic mechanism, however, is that the criteria mentioned below, which must be satisfied for optimum completion of the polymerisation reaction, are not adequately satisfied. In the first place, the catalyst should, if possible, be unaffected by atmospheric oxygen, water and carbon dioxide. Secondly, the catalyst should be readily soluble in dimethyl formamide and thirdly it should not decompose the dimethyl formamide at temperatures of up to +10° C.

It has now been found that colourless acrylonitrile polymers and solutions thereof can be obtained in high yields by polymerising acrylonitrile in organic solvents. According to the invention, acrylonitrile is polymerised at a temperature from +10 to −68° C. in an organic solvent for polyacrylonitrile or in a mixture of such solvents and in the presence of a small quantity of an alkali-metal salt of an aromatic sulfonamide of the general formula

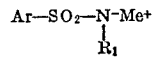

in which Me represents lithium, sodium, potassium, rubidium or caesium, Ar represents an aryl radical and $R_1$ represents an alkyl radical with up to 6 carbon atoms.

Dimethyl formamide or dimethyl sulfoxide is preferably used as the organic solvent. The alkali-metal salts of the sulfonamides are solid, crystalline and colourless compounds obtained by reacting sulfonamides of the general formula

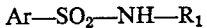

wherein Ar and $R_1$, have the meanings given above, with alkali-metal hydroxides in inert solvents. The alkali-metal salts are unaffected by atmospheric oxygen and are readily soluble both in dimethyl formamide and in dimethyl sulfoxide, neither of which is decomposed by the catalyst.

Although it is known that aromatic sulfonamides can be reacted with acrylonitrile to form the corresponding cyanoethyl compounds in the presence of alkali-metal hydroxides or in the presence of alkaline catalysts, it could not be assumed that they would be effective as polymerisation catalysts because cyanoethylation reactions of this kind are carried out at elevated temperatures, yielding low-molecular weight cyanoethyl sulfonamides as the reaction products.

The polymerisation initiators are preferably dried before use. They are used in quantities of at least 0.1 mmol. and at most 0.1 mol., based on the monomer, and preferably in quantities from 0.05 mol. to 0.4 mmol. Polymerisation itself is carried out in the absence of water and carbon dioxide in polymerisation vessels which can be effectively cooled. There is no need to remove every trace of oxygen before polymerisation. The catalysts are introduced into the polymerisation medium, preferably at around room temperature and the catalyst solution is then cooled to around −60° C. Dried monomeric acrylonitrile is then run into the polymerisation vessel over a short period. When, after a brief latent period, the beginning of polymerisation is indicated by a rise in temperature, precautions should be taken in the form of external cooling to ensure that the temperature in the reaction zone does not, if possible, exceed 5° C. Polymerisation is complete after a few hours. The polymers can be precipitated from the clear solutions. It is also possible directly to obtain films or fibres from solutions of the polymer solutions.

Compared with conventional catalysts, the catalysts used according to the present invention are distinguished by the fact that they are not toxic and are easier to measure out accurately because the sulphonamide salts in question are easily handled, solid compounds which do not give off hydrocyanic acid or hydrogen sulphide under the influence of carbon dioxide or of acids.

Suitable alkali metals include the metals of the First Group of the Periodic System, whilst suitable sulfonamides include all those aromatic sulfonamides containing a hydrogen atom on the sulfonamide nitrogen, although it is preferred to use sulfonamides of the formula shown because with these compounds, the solubility of the catalyst in the reaction medium can be favourably influenced by varying the radical R. Examples of sulphonamides whose alkali-metal salts are suitable for use as catalysts for the polymerisation of acrylonitrile, include the following: benzene sulfonamide, benzene N-methyl sulfonamide, toluene N-isopropylsulfonamide, toluene N-methyl sulfonamide and benzene N-hexylsulfonamide.

The amides of such substituted aryl sulfonic acids whose substituents do not contain any Zeriwitinoff-active hydrogen, within the aryl moiety of the molecule are also suitable. The following examples illustrate the invention more particularly.

Example 1

2,000 parts by volume of dimethyl formamide are introduced into a polymerisation vessel equipped with a stirring mechanism. 0.9 g. of potassium toluene N-methyl-sulfonamide are then introduced in the absence of carbon dioxide, and soon dissolved. The temperature is adjusted to from −70° C. to −72° C. by external cooling, after which 212 parts by weight of acrylonitrile are run in over a short period. Polymerisation begins after a short latent period. Its progress can be followed very closely from the increase in the viscosity of the reaction mixture. The batch is stirred for another three hours, after which polymerisation is stopped by the addition of a little HCl. A clear, almost colourless polymer solution is obtained. The polymer is obtained in a yield in excess of 95% and has a K-value of 61.

Example 2

800 parts by weight of dimethyl formamide are introduced into a polymerisation vessel after air has been displaced from it by dry nitrogen. 0.14 part by weight of sodium toluene N-methyl sulfonamide are then added in the absence of carbon dioxide and atmospheric moisture. The temperature of the mixture is lowered to from −60 to −65° C., after which 150 parts by weight of acrylonitrile are run in over a short period. Polymerisation begins quickly and very smoothly. The batch is kept at the reaction temperature for another three hours, after which a little formic acid is added in order to deactivate the polymerisation catalyst.

A clear polymer solution is obtained which can be directly processed to form mouldings. An 80.7% conversion is obtained during polymerisation. The K-value of the resulting polymer is 101.6.

Example 3

The procedure is as in Example 2 except that 0.153 parts by weight of potassium toluene N-methylsulfonamidemethylamide are used as the catalyst. In this case, a polymer with a K-value of 93.5 is obtained, after an 80.8% conversion, in the form of a colourless polymer solution in dimethyl formamide which is free from substances that swell and from which extremely clear thermally stable foils and films can be obtained.

What we claim is:

1. A process for the production of acrylonitrile polymer solutions by polymerizing acrylonitrile in an organic solvent for polyacrylonitrile, which comprises polymerizing acrylonitrile in dimethylformamide or dimethyl-sulfoxide at a temperature from −68° C. to +10° C. in the presence of 0.1 mmol. to 0.1 mol., based on monomer, of an alkali-metal salt of an aromatic sulfonamide of the formula

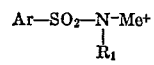

wherein Me represents lithium, sodium, potassium, rubidium or caesium, Ar represents a benzene or toluene radical, and $R_1$ represents an alkyl radical of 1–6 carbon atoms.

2. The process of claim 1, wherein said alkali-metal salt of an aromatic sulfonamide is potassium toluene N-methyl-sulfonamide.

References Cited

UNITED STATES PATENTS

| | | | |
|---|---|---|---|
| 3,242,125 | 3/1966 | Walker | 260—30.8 |
| 3,006,894 | 10/1961 | Evans | 260—63 |

ALLAN LIEBERMAN, *Primary Examiner.*

U.S. Cl. X.R.

260—32.6, 85.5, 88.7